Dec. 3, 1946.  W. MELIN  2,411,972
CENTERLESS GRINDING MACHINE
Filed March 10, 1945  2 Sheets-Sheet 1

Inventor
William Melin
Barthel & Bugbee
Attorney

Dec. 3, 1946.  W. MELIN  2,411,972
CENTERLESS GRINDING MACHINE
Filed March 10, 1945  2 Sheets-Sheet 2
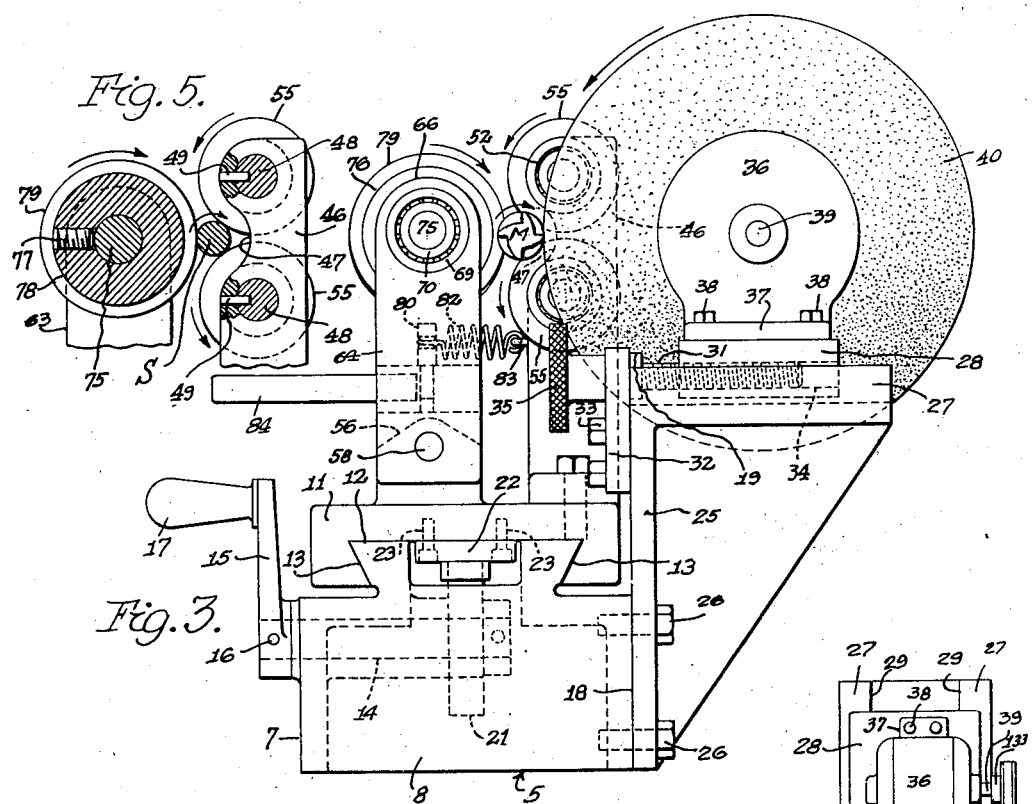
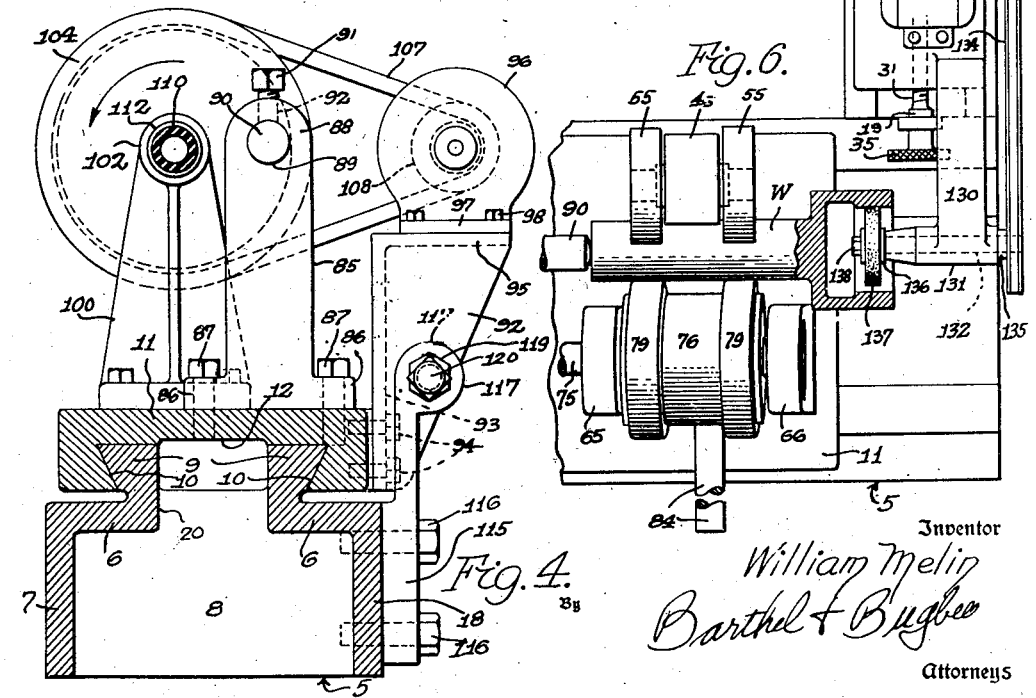
Inventor
William Melin
Barthel & Bugbee
Attorneys Patented Dec. 3, 1946

2,411,972

UNITED STATES PATENT OFFICE 2,411,972

CENTERLESS GRINDING MACHINE

William Melin, Grand Rapids, Mich.

Application March 10, 1945, Serial No. 582,029

6 Claims. (Cl. 51—95)

The present invention relates to grinding machines, and more particularly to a machine for grinding and finishing rotary cutting tools to their true circular size.

The primary object of the invention is to provide a support for presenting round work to the grinding wheel of a grinding machine in such a manner that the work will be ground to its true circular shape and size with respect to the center thereof.

Another object of the invention is to provide a device of the above-mentioned type in which the work is rotated at a speed different than the speed of the grinding wheel while being ground and finished so that the peripheral surfaces thereof will be finished to circular size and shape more accurately and with a comparatively high degree of precision finish and polish.

Another object of the invention is to provide a machine of the type set forth in the preceding paragraph which is particularly adapted for grinding and finishing the relief surfaces of rotary cutting tools such as end mills and drills so that said rotary tool will have all of its peripheral surfaces spaced equidistant from the center of the tool and in true concentricity therewith.

Another object of the invention is to provide a machine for grinding the relief edges of end mills and other rotary cutting tools such as twist drills and reamers in which the support therefor, in addition to supporting and rotating the tool relative to the grinding wheel is movable to feed the rotary cutting tool axially of the peripheral surface of the grinding wheel and thereby grind and finish said relief edge through the entire length or pitch of the cutting tool.

Another object of the invention is to provide a machine tool in which the grinding wheel is driven by an independent source of power to permit the grinding wheel to be moved laterally toward and away from the work and to provide the rotary work support with a separate source of power so that the support may be fed axially with respect to the grinding wheel and thereby grind and finish the lands and cutting portion of the rotary tool without necessitating resetting or shifting of the tool during grinding and finishing thereof.

Another object of the invention is to provide a grinding machine for rotary tools of the above-mentioned type in which the work roll may be manually moved away from the supporting rolls to permit the insertion and removal of the cutting tool after the peripheral edge or land thereof has been ground and finished.

Another object of the invention is to provide a grinding machine of the above-mentioned type in which the work roll is tilted or slightly canted so as to prevent the removal of the rotary cutting tool while being ground and to eliminate the use of work centers without impairing the accuracy of the finished work piece.

Other objects and advantages of the invention will become apparent during the course of the following description of the invention as shown in the accompanying drawings, wherein:

Figure 3 is an end elevational view of the grinding machine showing the work and supporting rolls thereof so as to properly present the work to the peripheral surface of the grinding machine;

Figure 4 is a vertical cross-sectional view taken on the zig-zag line 4—4 of Figure 1 and looking in the direction of the arrows to illustrate the motor support and the flexible drive for the work roller;

Figure 5 is a vertical cross-sectional view of the work roll and work supporting rolls to illustrate their position and arrangement relative to one another; and Figure 6 is a top plan view of a modified grinding machine structure illustrating a slightly different grinding wheel arrangement for grinding internal diameters of various work pieces.

Figure 1:
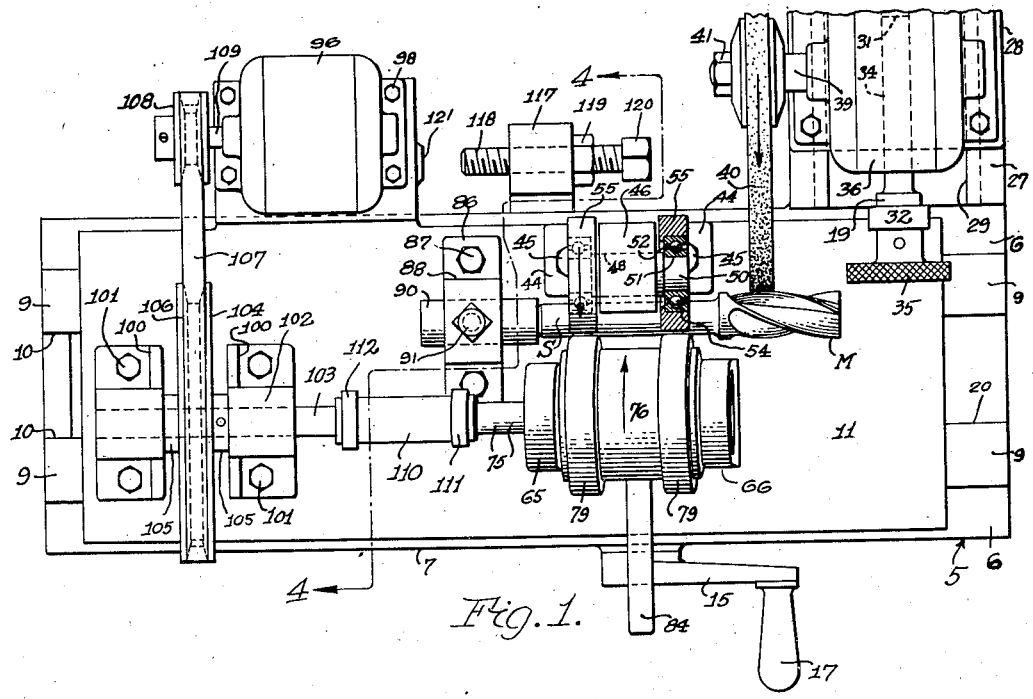
Figure 1 is a top plan view of the grinding and finishing machine embodying the invention.

In the drawings, attention is directed to Figures 1 to 5 inclusive wherein the reference character 5 will generally be employed to designate a machine bed or base of a grinding machine and said bed consists of a rectangular casting having a top wall 6, front and rear walls 7 and 18 and end walls 8 connected thereto. Extending longitudinally of the top wall 6 is a pair of spaced guide ribs 9 undercut as at 10 to provide slide ways for accommodating a slide 11. The slide 11 is provided with a longitudinal groove 12 on the underside thereof for slidably receiving said slide ways 9 and the walls of said slot 12 are undercut as at 13 to mate with the undercut portion of the guide ribs 9 and thereby retain said slide in slidable engagement with the bed 5.

Journaled in a bearing boss formed integral with the front wall 7 and top wall 6 of the machine bed or base 5 is an operating shaft 14 having one end projecting through the said wall 7 and fitted with an operating crank 15 secured thereto as at 16. A handle 17 is formed on the crank 15 to facilitate rotation of the shaft 14 and the opposite end of the shaft is disposed directly beneath a slot 20 formed in the top wall 6 of the machine bed or base and is provided with a gear wheel 21 keyed or otherwise affixed thereto. Secured to the underside of the slide 11 and within the groove 20 therein is a rack bar 22 held in place by longitudinally spaced anchoring bolts 23. The teeth 24 of the rack bar 22 are in mesh with the teeth on the gear wheel 21 so that rotation of the shaft 14 by the crank 15 will cause said gear teeth to drivingly engage said rack and feed the slide longitudinally along the machine base or bed 5.

Mounted on the rear wall 18 of the machine base 5 is a motor and grinding wheel supporting bracket 25 of angle formation having one of its extensions bolted as at 26 to the rear wall 18 of the machine base or otherwise fastened in place, while the other extension 27 extends rearwardly and provides a platform or support for an adjustable slide 28. The platform extension 27 is provided with a dove-tailed slot 29 for receiving the dove-tailed slide rib 30 on the underside of the adjustable slide 27. An adjusting screw 31 has one of its ends mounted for rotation in a bearing plate 32 bolted to the angle bracket 25 by means of bolts or the like as at 33. A threaded bore 34 is formed in the slide 28 for receiving the threaded end of the screw shaft 31 so that rotation of said shaft as by means of a knurled hand piece 35 affixed on said shaft will feed the side 27 forwardly and rearwardly of the machine base or frame 5. The screw shaft 31 is provided with an annular enlarged portion 19 in abutting relationship with the bearing plate 32 to prevent endwise movement of the shaft.

Secured to the slide 28 is an electric motor 36 having its base 37 fastened to the slide 27 by means of bolts or machine screws 38. The armature shaft 39 of the motor 36 projects a considerable distance beyond the motor frame and said motor shaft is adapted to rotatably support a grinding wheel 40 the hub of which as at 41 is slidably received on said armature shaft and held in place by means of a retaining nut 41.

A bracket plate 44 is mounted on the slide 11 and said bracket plate is bolted in place by means of machine screws or the like as at 45. Formed integral with the bracket plate 44 is an upstanding supporting arm 46 and said arm is cut away as at 47 at one side thereof to provide sufficient room for the work pieces to be ground.

Mounted in the upper end of the upwardly extending arm 46 is a pair of horizontal shafts 48 secured in place by locking pins 49 and the ends of said shafts 48 are reduced as at 50 and are fitted with inner race members 51 having grooves for receiving anti-friction balls 52. An outer ball bearing race member 54 encircles the inner ball bearing race member 51 and fitted on the outer ball bearing race member 54 is a work engaging roller 55. It will thus be seen that the work engaging rollers 55 on each side of the upwardly extending arm 46 and on each end of the spaced shafts 48 are freely rotatable for engaging the work and supporting the same during grinding.

Figure 2:
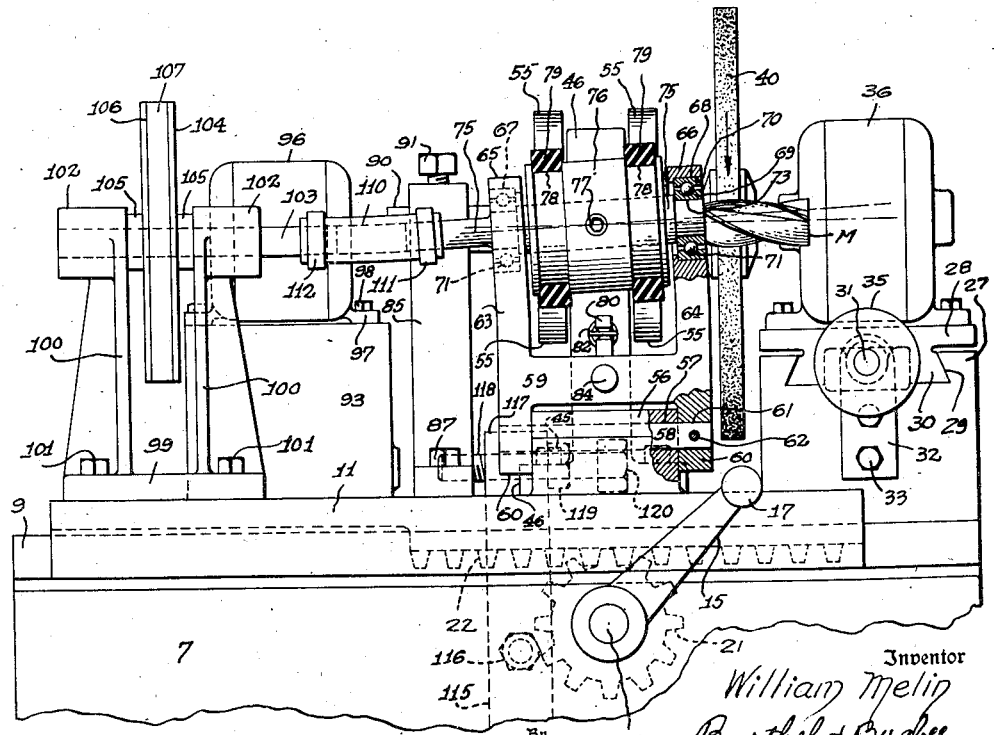
Figure 2 is a side elevational view of the grinding machine showing portions thereof broken away to illustrate various structural details of the work support.

Formed directly in front of the vertically extending arm 46 is an enlarged boss 56 having a transverse bore 57 through which extends a pivot shaft member 58. A work roller frame 59 is pivoted to the enlarged bore 56 and is provided at each side with downwardly extending arms 60 which straddle the enlarged boss 56 and receive the free ends of the shaft 58 in openings 61 therein. An anchoring pin 62 is passed transversely through the downwardly depending extension 60 and the shaft 58 to prevent endwise movement of the work roller frame 59 relative to the shaft 58. A pair of spaced upwardly extending arms 63 and 64 are formed on the work roller frame 59 and said arms are bent slightly as indicated in Figure 2 so that the upper end of the arm 63 as at 65 will be slightly shorter than the upper end 66 with the end portions in parallel relation and provided with suitable bores 67 and 68 respectively for receiving ball bearing race members having inner and outer bearing races 69 and 70 respectively. Anti-friction ball bearings 71 are mounted between the inner and outer race members 69 and 70 and the inner race member 69 is provided with a bore 73 for receiving the ends of a drive shaft 75. Mounted on the drive shaft between the ends of the arms 65 and 66 is a roller 76 held in place by means of a set screw 77 and said roller is provided with a spaced annular groove 78 adjacent each end thereof for receiving resilient work engaging means 79. The work engaging means 79 are adapted to fit snugly within the groove 78 and may be formed of rubber or a similar resilient material. It is noted that the drive shaft 75 is slightly angled to the horizontal and one end thereof is extended beyond the upwardly directed arm 65 to facilitate a driving connection therewith. The work roller frame 59 is provided with a coil spring anchoring pin 80 over which is fastened one end of a coil spring 82 while the opposite end of said spring is hooked in an eye 83 secured to the upstanding arm 46 of the bracket plate 44. It will thus be seen that the spaced upstanding arms 63 and 64 of the work roller frame 59 will be urged toward the work supporting rollers 55 so as to drivingly engage the shank S of an end mill M in position with the fluted portion of the end mill M presented to the peripheral surface of the grinding wheel 40. A handle 84 is secured to the work roll frame 59 so that the operator may depress the lever 84 and rock the work roll supporting frame 59 on its pivot pin 58 and retract the resilient work engaging rings 79 from engagement with the work and thereby permit another piece of work to be inserted and similarly removed after grinding. A work engaging stop is provided for the shank S of the end mill and includes a bracket arm 85 having a base as at 86 bolted to the slide 11 by means of machine screws or the like as at 87. The upper end 88 of the bracket arm 85 is provided with a transverse bore 89 for receiving a work engaging bar 90 which is adjustably held in place by means of a set screw 91 threaded in an opening 92 in the free end of the bracket arm 88 so that its inner end engages and clamps the work engaging support 90 in place.

A bracket 92 having a flanged portion 93 is bolted to the slide 11 by means of bolts or the like as at 94 and said bracket 92 extends upwardly from the slide 11 and is so disposed as to provide a platform 95 at the upper end thereof for supporting an electric motor 96. The base 97 of the electric motor is fastened in place by means of bolts or machine screws 98 having their threaded ends anchored in suitable openings in the platform 95. Also mounted on the slide 11 adjacent one end thereof is a bracket plate 99 having a pair of upstanding arms 100 and said bracket plate 99 is fastened to the slide by anchoring bolts 101 extending through the base 99 and into the top surface of the slide 11. The upper ends of the parallel arms 100 are provided with bearing bosses 102 in which is journaled a rotary shaft 103 in alignment with the work roll drive shaft 75. Mounted on the shaft 103 is a pulley 104 which has its hub 105 disposed between the bearing bosses 103 and said pulley is provided with a pulley groove 106 of V-formation for receiving a drive belt 107. The V-drive belt 107 is trained over a pulley 108 mounted on the end of the armature shaft 109 of the electric motor 96 so that rotation of the armature shaft will impart rotary motion to the drive shaft 103. A flexible tubular coupling member 110 has one of its ends fitted over the work roll drive shaft 75 and held in place by a clamp 111 surrounding the end of said tubular coupling so as to clampingly engage the same and cause said coupling end to be connected to the work roll drive shaft 75. The other end of the coupling 110 is fitted over the drive shaft 103 and is similarly provided with a clamping ring 112 for establishing a drive connection with the shaft 103. It will thus be seen that energization of the motor 96 will cause the shafts 75 and 103 as well as the yielding ring-like elements 79 on the work roll 76 to be rotated so as to impart rotation to the work piece while the same is held against the supporting roll 55.

A stop plate 115 is bolted to the rear wall 18 of the machine bed 5 by means of machine screws 116 and said stop plate is provided at its upper end with a boss 117 having a threaded opening for receiving an adjusting screw 118. The adjusting screw may be held in place by a lock nut 119 threaded thereon and engaging the boss 117 and a wrench-engaging head 120 formed on the end of the stop screw 118 to facilitate adjustment thereof. The free end of the adjusting screw 118 is adapted to engage a stop surface 121 formed on the side wall of the bracket 92 to limit the longitudinal movement of the slide 11 and the endwise feed of the end mill relative to the grinding wheel 40.

In the modified form of the invention in Figure 6, the grinding machine structure and fixture is identical to the work support shown in the form of the invention in Figures 1 to 5 inclusive with the exception that the slide 28 for supporting the motor 36 is provided with an extension 130 formed integral therewith, with the outer end of said extension enlarged as at 131 to provide a bearing boss for a short shaft 132. The armature shaft 39 is provided with a pulley 133 over which is trained a drive belt 134 and said belt 134 is adapted to drive a pulley 135 mounted on one end of the short shaft 132 and thereby rotate the same. The opposite end of the short shaft 132 is threaded for a portion of its length and provided with an enlarged portion 136 forming a collar for engaging and providing a limiting stop for the grinding wheel 137. A nut 138 is threaded on the end of the short shaft 132 to securely clamp the grinding wheel 137 in place.

It is noted that the work roll 76 is rotated in the opposite direction to the grinding wheel 40 so that the cutting surface of the tool such as an end mill, reamer or twist drill being ground will be given a highly polished finish to facilitate the passage of chips and prolong the life of the cutting tool.

In operation the motors 36 and 96 are started to cause the grinding wheel 40 and work roll 76 to be rotated in opposite directions. The knurled hand piece 35 is rotated to adjust and position the peripheral grinding surface of the grinding wheel 40 to the desired location with respect to the work. After the grinding wheel has thus been adjusted, a milling cutter M is positioned between the upper and lower supporting rolls 55 by retracting the work roll 76 and inserting said end mill so that by releasing the lever 84 the spring 82 will exert a force on the work roll supporting frame 59 and yieldingly urge said work roll toward the shank S of the end mill M so that the resilient rings 79 will have their peripheries in driving engagement with said shank as indicated in Figure 5. After the work piece has been placed between the work supporting rolls 55 and work roll 76, the hand crank 16 is rotated so as to feed the slide 11 to and fro with the fluted portion of the end mill M presented to the grinding wheel 40. Rotation of the work roll 76 feeds the shank S of the end mill M into contactual engagement with the work stop 99 to thereby prevent the end mill from becoming displaced during the grinding operation. After the end mill has been ground to the required circular size, the lever 84 is depressed and the end mill removed from between the work supporting rollers 55.

As shown in Figure 6, a work piece W is supported between the work supporting rolls 55 carried by the upper end of the bracket arm 46 and said work piece is likewise engaged by the work roll 76 with the yielding rubber rings thereon as at 79 in driving engagement with a portion of said work piece. When it is intended to grind the internal surface of a piece of work, the grinding machine shown in Figures 1 to 5 may be easily converted by substituting the slide as at 28 having an extension 130 and grinding wheel 137 at the end thereof in lieu of the slide 28, motor 36 and grinding wheel shown and described in Figures 1 to 5 inclusive. To transpose the grinding machine to the type shown in Figure 6 it is simply necessary to rotate the knurled handpiece 35 to displace the slide 28 in either case and replace the same with the slide 28 as desired.

It is to be understood that the forms of the invention herewith shown and described are to be taken as preferred embodiments of the invention and that various changes may be made in the shape, size and arrangement of parts without departing from the spirit of the invention or the scope of the subjoined claims.

What I claim is:

1. A grinding machine, comprising a base, a slide mounted for movement thereon, a grinding wheel carried by the base, work supporting rolls mounted on the slide to receive a work piece, a work driving roll mounted between the work supporting rolls and offset therefrom, a motor and speed-reducing mechanism mounted on the slide, and a flexible coupling connection between the speed-reducing mechanism and work driving roll, said motor being yieldingly connected to the work driving roll and said work driving roll being provided with resilient work engaging portions and disposed with its axis at an angle with respect to the axis of the work supporting rolls.

2. A centerless grinder, comprising a base, a slide movably mounted on said base, a grinding wheel supported rearwardly of said base and projecting above said slide, a pair of spaced apart work supporting rolls mounted vertically one above the other on the slide, a frame pivoted to said slide adjacent said work supporting rolls, a work driving roll mounted in the frame for movement toward and away from said work supporting rolls in an approximately horizontal direction for gripping a work piece therebetween at three circumferentially spaced points, drive means carried by the slide for driving said work driving roll, and means for yieldingly urging said work driving roll toward said work supporting rolls.

3. A centerless grinder, comprising a base, a slide movably mounted on said base, a grinding wheel supported rearwardly of said base and projecting above said slide, a pair of spaced apart work supporting rolls mounted vertically one above the other on the slide, a frame pivoted to said slide adjacent said work supporting rolls, a work driving roll mounted in the frame for movement toward and away from said work supporting rolls in an approximately horizontal direction for gripping a work piece therebetween at three circumferentially spaced points, drive means carried by the slide for driving said work driving roll, and means for yieldingly urging said work driving roll toward said work supporting rolls, said work driving roll being tilted to the horizontal to feed said work against a stop carried by the slide.

4. A centerless grinder, comprising a base, a slide movably mounted on said base, a grinding wheel supported rearwardly of said base and projecting above said slide, a pair of spaced apart work supporting rolls mounted vertically one above the other on the slide, a frame pivoted to said slide adjacent said work supporting rolls, a work driving roll mounted in the frame for movement toward and away from said work supporting rolls in an approximately horizontal direction for gripping a work piece therebetween at three circumferentially spaced points, drive means carried by the slide for driving said work driving roll, means for yieldingly urging said work driving roll toward said work supporting rolls, and work stop means carried by the slide at one end of said work supporting and driving rolls for engaging said work piece.

5. A centerless grinder, comprising a base, a slide movably mounted on said base, a grinding wheel supported rearwardly of said base and projecting above said slide, a pair of spaced apart work supporting rolls mounted vertically one above the other on the slide, a frame pivoted to said slide adjacent said work supporting rolls, a work driving roll mounted in the frame for movement toward and away from said work supporting rolls in an approximately horizontal direction for gripping a work piece therebetween at three circumferentially spaced points, drive means carried by the slide for driving said work driving roll, means for yieldingly urging said work driving roll toward said work supporting rolls, and a stop adjacent one end of said work supporting and driving rolls, said work driving roll being inclined to feed the end of said work into engagement with said stop.

6. A centerless grinder, comprising a base, a slide movably mounted on said base, a grinding wheel supported rearwardly of said base and projecting above said slide, a pair of spaced apart work supporting rolls mounted vertically one above the other on the slide, a frame pivoted to said slide adjacent said work supporting rolls, a work driving roll mounted in the frame for movement toward and away from said work supporting rolls in an approximately horizontal direction for gripping a work piece therebetween at three circumferentially spaced points, drive means carried by the slide for driving said work driving roll, means for yieldingly urging said work driving roll toward said work supporting rolls, a handle connected to said work driving roll supporting frame to move the work driving roll away from said work supporting roll, and a stop means carried by the slide engageable with adjustable stop means on the base for limiting sliding movement of said slide relative to the base.

WILLIAM MELIN.